Dec. 19, 1933.   M. M. SILVA   1,940,025
FARM DUMPING VEHICLE
Filed Jan. 30, 1933

INVENTOR
M. M. Silva
ATTORNEY

Patented Dec. 19, 1933

1,940,025

UNITED STATES PATENT OFFICE 1,940,025

FARM DUMPING VEHICLE

Manuel M. Silva, Gustine, Calif.

Application January 30, 1933. Serial No. 654,148

2 Claims. (Cl. 298—23)

This invention relates to farm vehicles for conveying various products from one part to another on a farm and subsequently dumping such products, though the sphere of usefulness of this vehicle is by no means confined to the farm.

The principal object of my invention is to provide a vehicle of this general character having a body mounted thereon for downwardly tilting movement at its rear end, and a relatively movable closure for the rear open end of the body so arranged that the tilting of the body is automatically accompanied by a relative opening movement of the closure, so that as soon as the body is tilted its contents will discharge of themselves onto the ground and without restraint. A further object is to arrange the closure operating mechanism so that when the body is thus tilted the closure is practically clear of the rear end of the body so as to offer no interference with a very rapid discharge of the contents.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
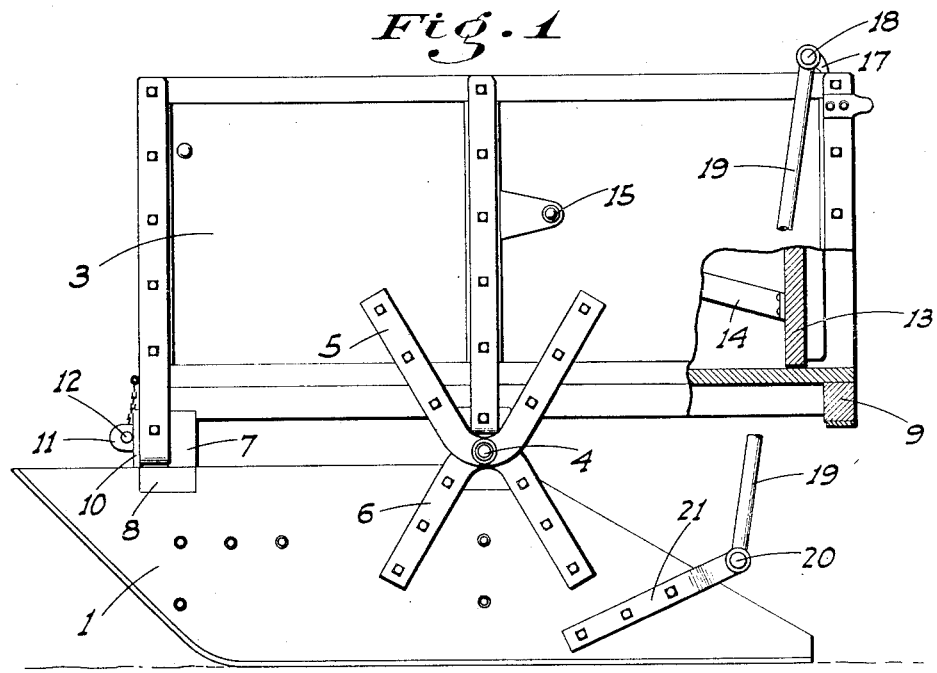
Fig. 1 is a side elevation of the vehicle showing the body in its conveying position.

Referring now more particularly to the characters of reference on the drawing, the numeral 1 denotes the base structure of the vehicle on which the body is supported. In the present instance this structure is shown as comprising transversely spaced metal-bound skids connected together to form a rigid unit and adapted to rest directly on the ground. Each skid is provided with a hook 2 or the like adjacent its forward end so that it may be attached to the harness of a draft animal. A wheel supported base could of course be used however instead of the skids wherever desired without any invention and wherever the skids are not feasible.

Figure 2:
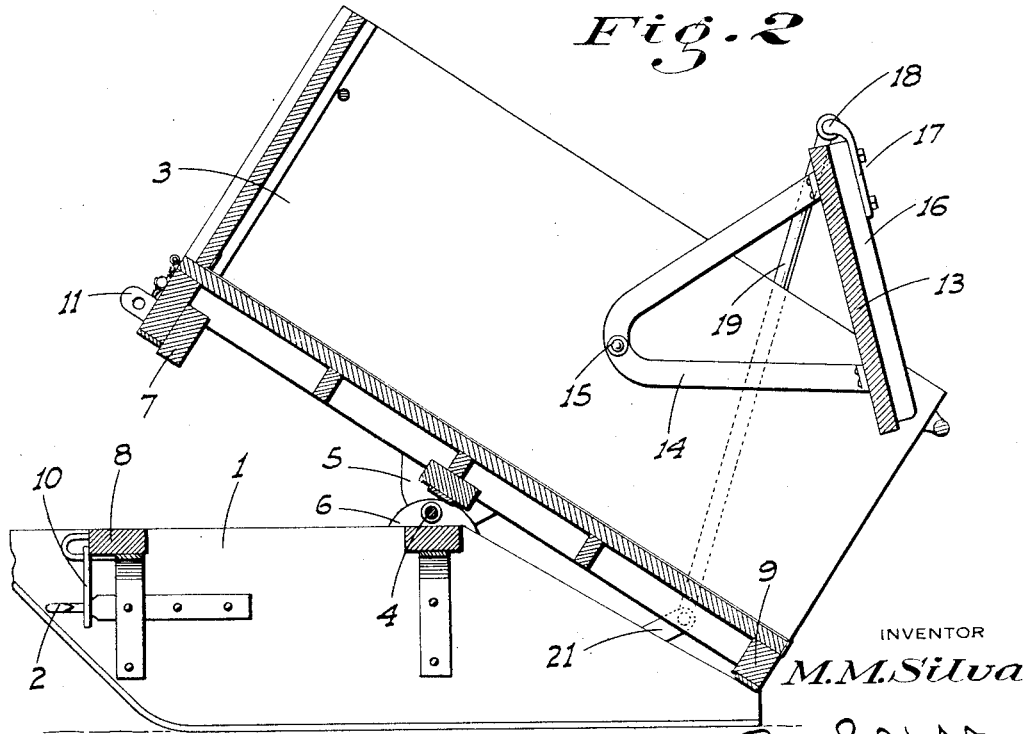
Fig. 2 is a sectional elevation of the vehicle showing the body in its dumping position.

Superimposed on the base is the body 3 of the wagon, permanently closed along its sides and at the front end but freely open on top and at the rear end. This body is pivoted intermediate its ends on the base by a cross bolt 4 supported by side straps 5 secured to and depending from the body and by similar straps 6 upstanding from the sides of the base members. The pivot bolt is thus disposed in a plane intermediate the bottom of the wagon and the top of the base enabling the body to be wider than the base if desired. A cross beam 7 on the body under its forward end normally rests on a cross beam 8 connecting the skids at the front, the body being then horizontal. The top edges of the skids rearwardly of the pivot bolt are cut away on a downward slant as shown so that the body may be tilted downwardly toward the rear to a desired and efficient dumping angle. A cross beam 9 on the body under its rear end then engages said sloping edges of the skids near the ground as shown in Fig. 2 so as to prevent further tilting of the body.

A hasp 10 is swivelly mounted on the cross beam 8 and is adapted to releasably engage a staple 11 on the cross beam 7, and through which a pin 12 removably passes to prevent disengagement of the hasp. When the hasp is thus engaged the body of course cannot tilt and is maintained in a horizontal position.

A rear end gate 13 is disposed between the sides of the body and forms a closure for the open end of the body when the latter is horizontal. Forwardly extending brackets or wings 14 on the gate are pivoted at their forward ends on the sides of the body as at 15 at a point somewhat rearwardly of the body pivot 4 and on a level substantially central of the height of the gate. The gate is backed by vertical reinforcing ribs 16, on which are mounted vertical straps 17 which at their upper ends support lateral projecting pins 18. These are disposed above the top level of the gate and body and extend beyond the sides of the latter.

These pins form pivotal supports for bars or rods 19 which are substantially vertical and depend to pivotal connections with laterally extending pins 20 mounted on straps 21 or the like secured on the outside of the skids 2. The pins 20 are disposed below the body pivot 4 and rearwardly of the same a greater distance than the gate pivots 15.

By reason of this arrangement it will be seen that the gate can swing relative to the body on said pivots 15, but is normally held from so doing by the additional supporting rods 19 which, in connection with the wings, hold the gate steady against the pressure of any rod. When the body is tilted however the pivots 15 are moved downwardly and rearwardly from their normal position, causing the gate to be tilted rearwardly somewhat. At the same time the rods 19 maintain the gate on substantially its original level, or relatively suspended. An opening substantially the height of the body is therefore formed between the bottom of the body and the bottom edge of the gate when the body is fully tilted as shown in Fig. 2. The contents of the body are therefore freely discharged, the angle of slope of the body when fully tilted being sufficient to cause such contents to slide of themselves onto the ground without restraint.

To initially cause the body to tilt it is of course only necessary to withdraw the pin 12, pull the hasp free of the staple and impart a slight upward pressure to the adjacent end of the body. The load then tending to shift of itself toward the rear unsupported overhanging portion of the body will then cause the same to tilt to its final position of itself.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A dumping vehicle comprising a portable base, a body superimposed thereon whose rear end is open, pivot connections between the base and body intermediate their ends to allow the latter to tilt downwardly and rearwardly from a normally horizontal position, a gate between the sides of the body at its open end, and closing the same when the body is horizontal, rods pivoted on the base outwardly of the sides of the body and on the gate at the top thereof, and means inside the body pivotally connecting the gate on the body in such position relative to the rods as to maintain the gate inwardly of the rear end of the body irrespective of any tilted position thereof.

2. A dumping vehicle comprising a portable base, a body superimposed thereon whose rear end is open, pivot connections between the base and body intermediate the ends of the latter, the base being arranged relative to the body to allow the latter to tilt downwardly toward the rear from a normally horizontal position, releaseable means on the body and base normally holding the body from tilting, means formed with the base to limit the tilting of the body, a rear end gate fitting between the sides of the body and closing the same when the body is horizontal, rods pivoted on the base rearwardly of said pivot connections and outwardly of the sides of the body and extending upwardly to pivotal connections with the gate at its top corners and above the body, forwardly projecting wings inside the body rigid with the gate, and pivot connections between the forward ends of said wings and the body positioned to maintain all portions of the gate always ahead of the rear ends of the sides of the body irrespective of its position relative thereto.

MANUEL M. SILVA.